United States Patent
Dulaney et al.

(10) Patent No.: US 6,373,876 B1
(45) Date of Patent: Apr. 16, 2002

(54) SINGLE MODE OSCILLATOR FOR A LASER PEENING LASER

(75) Inventors: Jeff Dulaney; David Sokol, both of Dublin, OH (US)

(73) Assignee: LSP Technologies, Inc., Dublin, OH (US)

( * ) Notice: Subject to any disclaimer, the term of this patent is extended or adjusted under 35 U.S.C. 154(b) by 0 days.

(21) Appl. No.: 09/178,968

(22) Filed: Oct. 26, 1998

(51) Int. Cl.[7] .................. H01S 3/098; H01S 3/08; G02B 9/08; B23K 26/14
(52) U.S. Cl. ............... 372/98; 372/18; 372/19; 372/98; 372/99; 372/103; 219/121.68; 359/739
(58) Field of Search .............. 372/98, 99, 97, 372/101, 103, 105, 106, 108, 10, 18, 19; 219/121.68, 121.69; 359/739, 888, 894

(56) References Cited

U.S. PATENT DOCUMENTS

| | | | |
|---|---|---|---|
| 3,576,502 A | * 4/1971 | Johnston et al. | ........... 331/94.5 |
| 3,628,173 A | * 12/1971 | Hans | ........... 331/94.5 |
| 4,408,334 A | 10/1983 | Lundstrom | |
| 5,127,019 A | * 6/1992 | Epstein et al. | ........... 372/108 |
| 5,566,195 A | * 10/1996 | Heppner et al. | ........... 372/3 |
| 5,987,042 A | * 11/1999 | Staver et al. | ........... 372/30 |
| 6,198,069 B1 | * 3/2001 | Hackel et al. | ........... 219/121.6 |

OTHER PUBLICATIONS

Solid–State Laser Engineering, Walter Koechner, pp. 170, 171,194,366.
Birefringence compensation in polarization coupled lasers, J. Richards, Jul. 1, 1987, pp. 2514–2517.

* cited by examiner

*Primary Examiner*—Frank G. Font
*Assistant Examiner*—Armando Rodriguez
(74) *Attorney, Agent, or Firm*—Randall J. Knuth

(57) ABSTRACT

A technique for increasing the lifetime of optical components that are used in a laser for laser shock peening. The technique employs a properly sized iris or a gradient reflector within a laser oscillator to produce a single-transverse-mode laser beam. This technique eliminates hot spots that significantly reduce the lifetime of optical components. Utilization of the present invention can increase the lifetime of components by a factor of ten of their conventional lifetime.

38 Claims, 4 Drawing Sheets

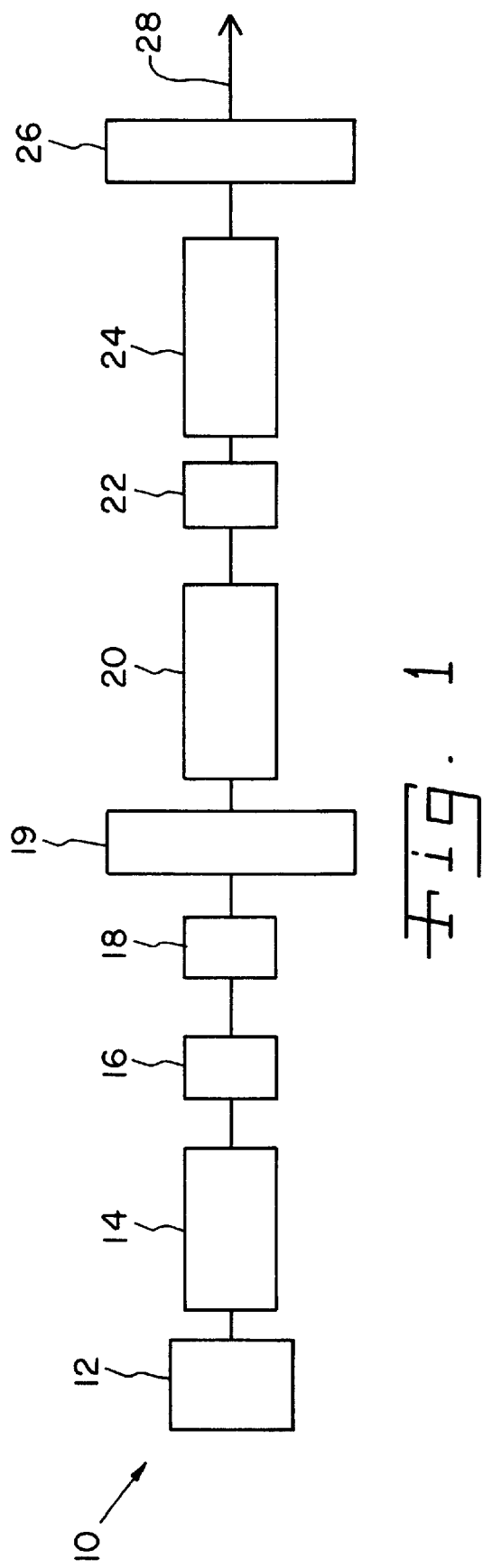
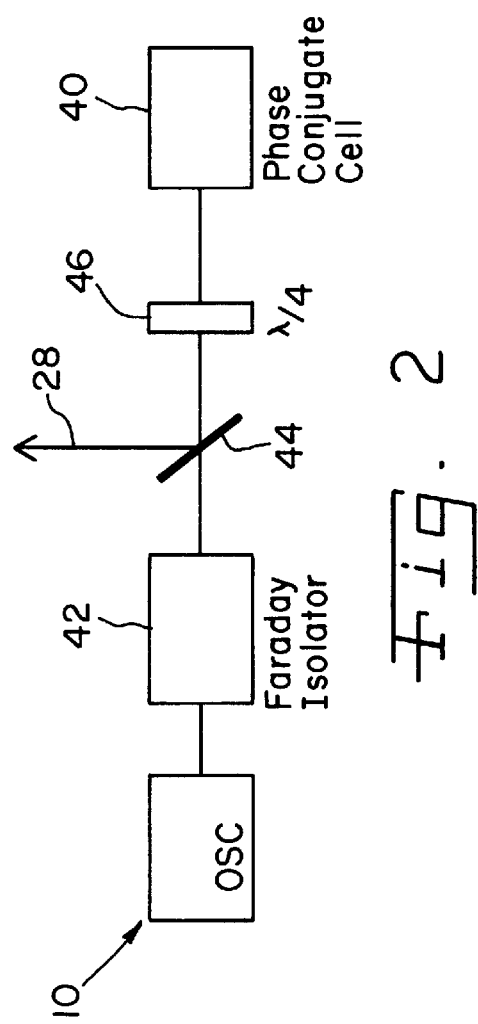
Fig. 1
Fig. 2

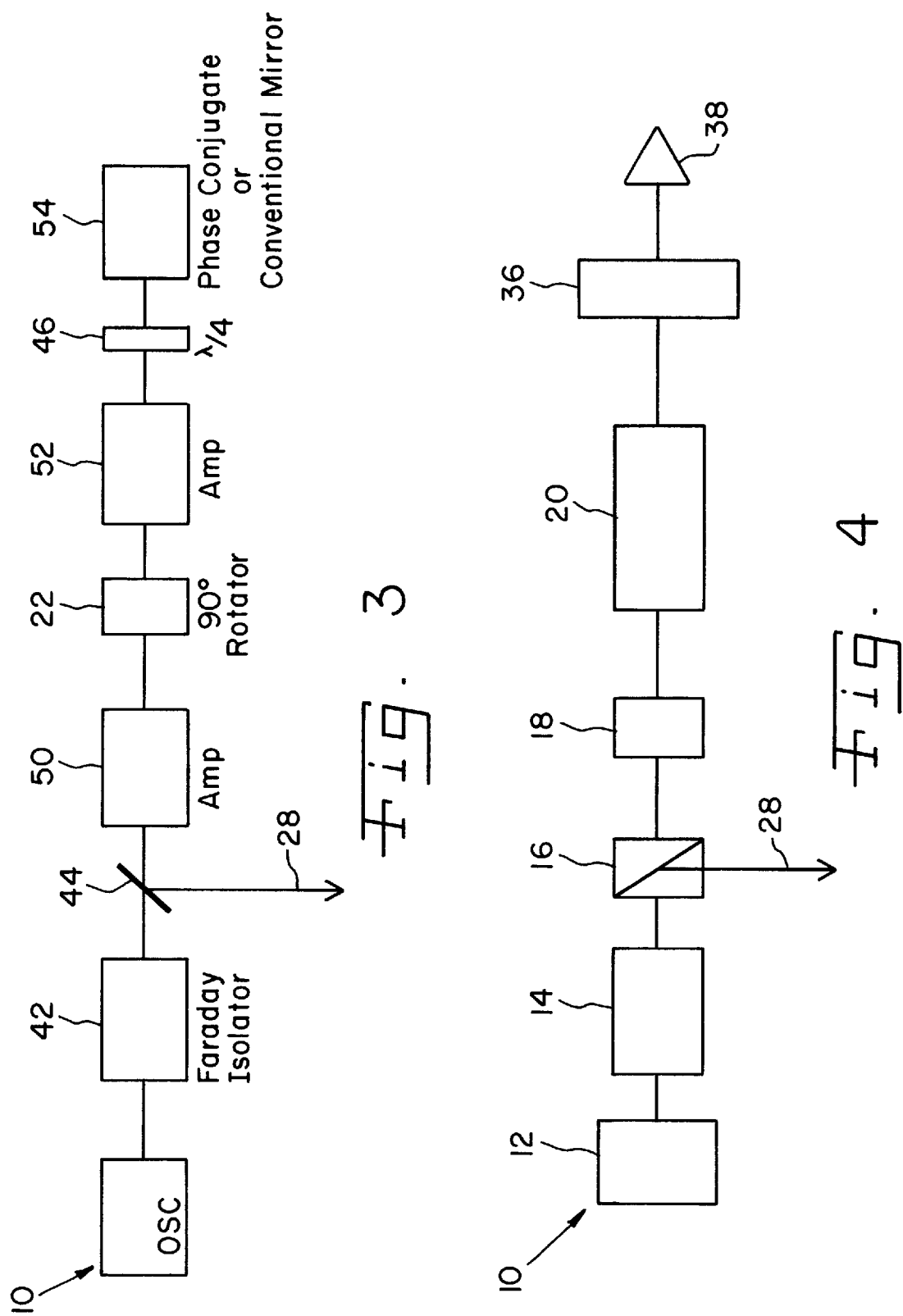

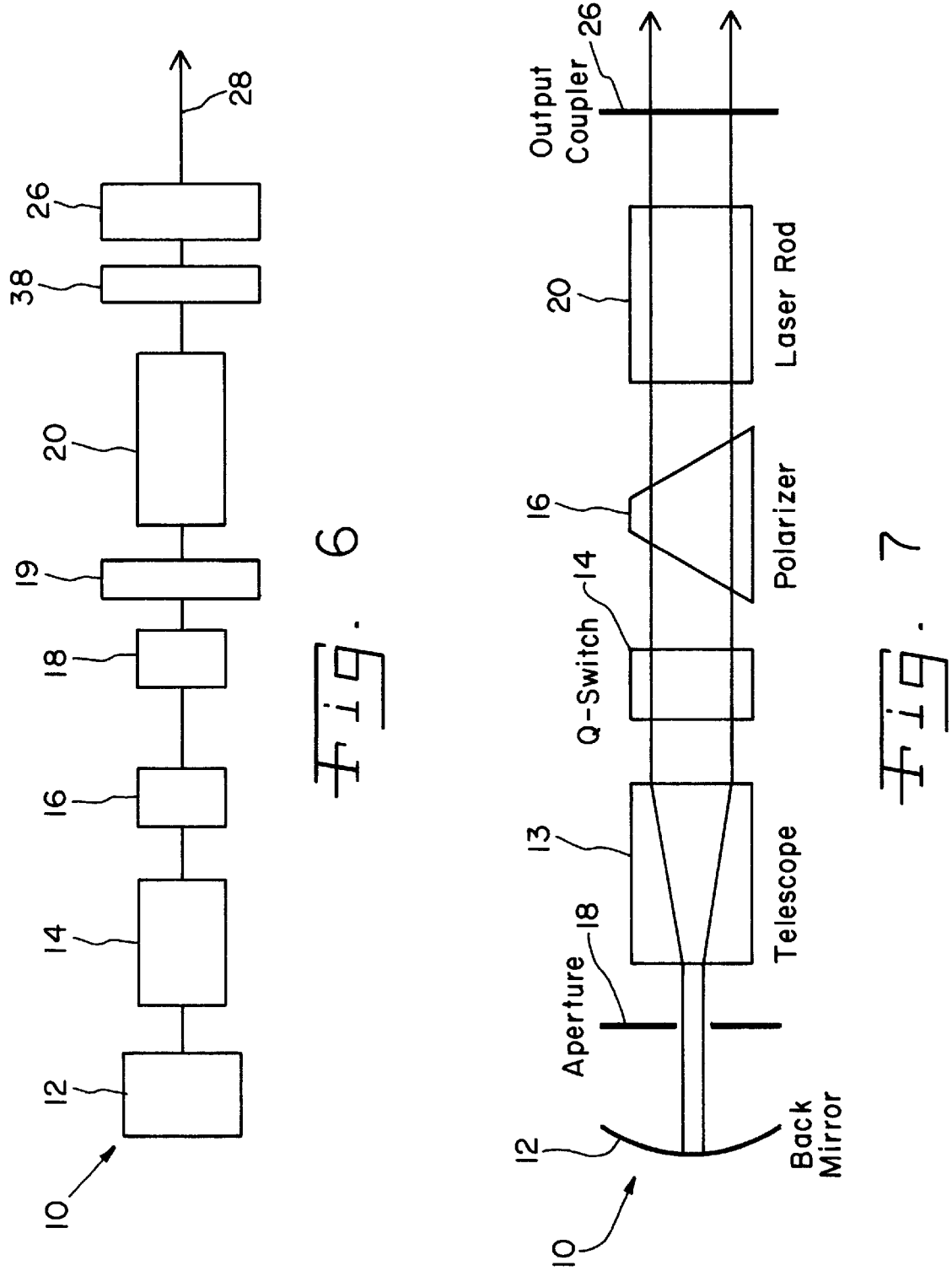

SINGLE MODE OSCILLATOR FOR A LASER PEENING LASER

BACKGROUND OF THE INVENTION

1. Field of the Invention

The present invention relates to the use of a coherent energy source for a high powered pulse laser, in the shock processing of materials, and more particularly to, a laser oscillator for such use, operating in a single-transverse-mode.

2. Description of the Related Art

Current lasers used in laser peening typically utilize an oscillator of the dual pump cavity type, in which the time integrated spatial profile is flat. The effect of stress birefringence in this oscillator is compensated for by a 90 degree rotator positioned between the dual pump cavities. This technique eliminates the maltese-cross pattern which is not considered desirable for laser peening.

A disadvantage of this type of dual-pump cavity oscillator, and almost any other large aperture oscillator, is that the output beam is in multi-transverse and multi-longitudinal-modes. The multi-mode nature of large aperture oscillators inherently generates hot spots in the beam because of the interaction of the different modes. These hot spots greatly decrease the lifetime of optical components through which the beam passes. Optical coatings utilized within the laser oscillator and associated laser system typically begin to show damage within ten thousand shots or bursts of the laser peening system, and typically must be replaced within one hundred thousand shots. This type of damage increases maintenance costs.

What is needed in the art is a laser peening laser utilizing a oscillator operating in a single mode to reduce damage to the associated optical components.

SUMMARY OF THE INVENTION

The present apparatus is that of a laser oscillator operating in a single-transverse mode. In one embodiment of the present invention, the oscillator is made to operate in a single-transverse mode by utilizing an iris sized to eliminate all modes but the lowest order TEM00 mode. In another embodiment a gradient reflector is used to produce a single-transverse mode. The oscillator may also include a means for compensating for stress birefringence. In addition, a telescope may be placed inside the oscillator for optimizing the diameter of the oscillator beam and for controlling thermal lensing.

In another embodiment of the invention, the oscillator utilizes a porro prism in combination with a retardation plate to reduce stress birefringence while further providing a means for generating a single-transverse-mode laser pulse.

Other embodiments of the present invention, include generating a single-transverse and single-longitudinal mode laser pulse via the addition of a seed laser or an etalon.

In one form of the invention thereof, a method for laser peening a workpiece, comprises generating a laser pulse from a substantially single-transverse mode oscillator, modifying the laser pulse with a pulse sharpening device, amplifying the laser pulse, and directing the laser pulse to the workpiece.

In another form of the invention thereof, an apparatus for laser peening a workpiece, comprises a substantially single-transverse mode laser oscillator, a laser pulse-sharpening device, means for amplifying a laser pulse, and a laser peening cell.

An advantage of the present invention is that a remarkable increase in the lifetime of components is created through the use of a single-transverse mode laser oscillator. Data confirms that such optical damage is not seen until approximately fifty thousand laser shots are utilized through the laser peening system. Without such single-transverse-mode utilization, such shots contain hot spots with energy densities greater than twice the normal level.

Another advantage of the present invention is that the lifetime of optical components may be extended at least up to five hundred thousand shots and possibly two million shots. Such extension in the component lifetime reduces maintenance costs and makes laser peening operations cost effective.

A further advantage of the present invention is that the TEM00 mode beam created has a higher density of laser energy at its center than a multimode beam and this produces a flatter beam spatial profile after amplification. An additional advantage of the present invention is that the TEM00 mode beam created has low divergence.

BRIEF DESCRIPTION OF THE DRAWINGS

The above-mentioned and other features and advantages of this invention, and the manner of attaining them, will become more apparent and the invention will be better understood by reference to the following description of the embodiments of the invention taken in conjunction with the accompanying drawings, a wherein:

FIG. 1 is a diagrammatic view of a dual-pump cavity design of the present invention;

FIG. 2 is a diagrammatic view of a laser oscillator in combination with an external phase conjugate cell;

FIG. 3 is a diagrammatic view of a laser oscillator in combination with a amplification cell;

FIG. 4 is a diagrammatic view of a laser oscillator in combination with a porro prism;

FIG. 6 is a diagrammatic view of a laser oscillator in combination with an etalon; and FIG. 7 is a diagrammatic view of a laser oscillator similar to that of FIG. 1 but utilizing a single pump cavity with the addition of an internal telescope.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 5:
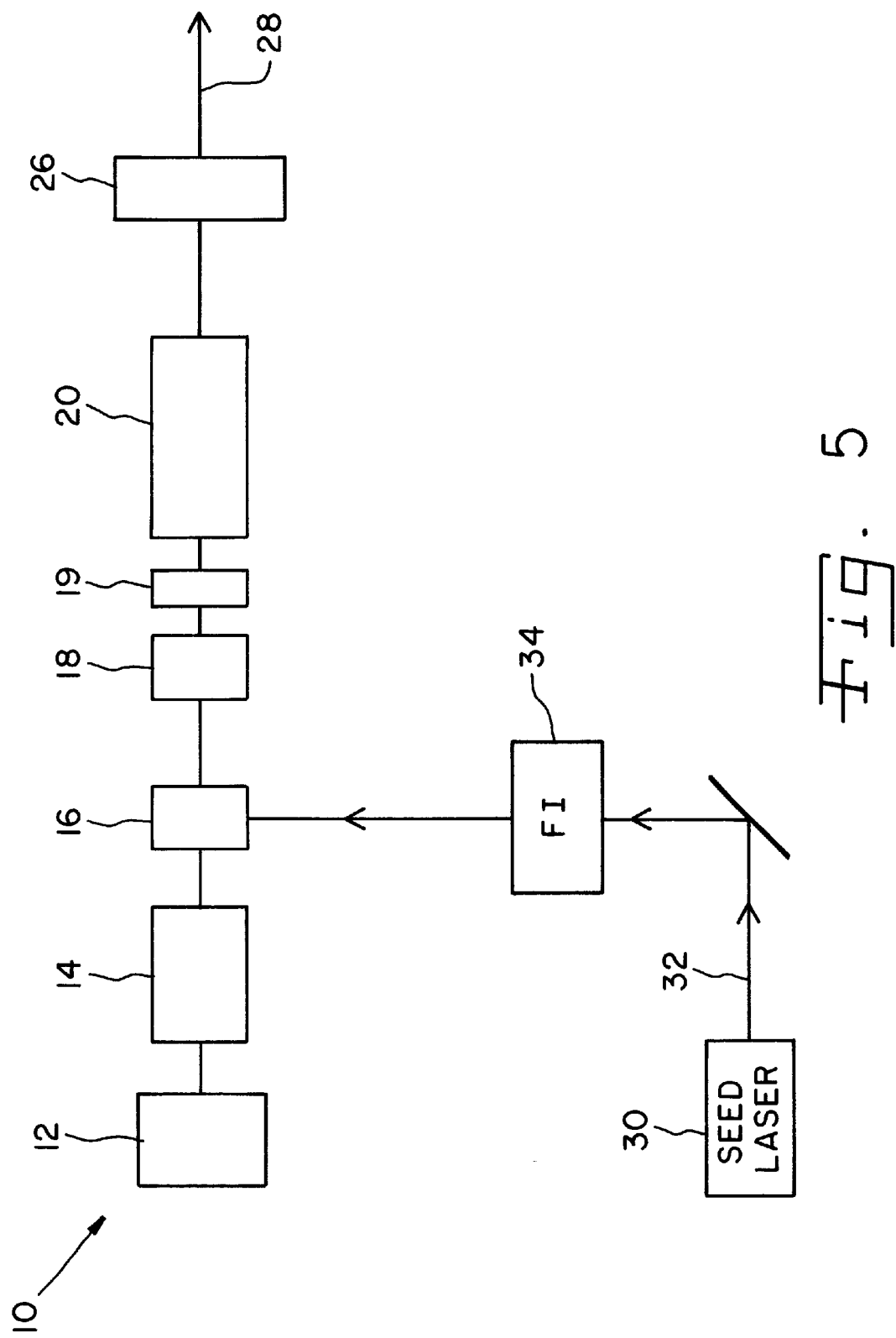
FIG. 5 is a diagrammatic view of a laser oscillator in combination with a seed laser.

The present invention, in one embodiment thereof, is shown in FIG. 1. Laser oscillator 10 comprises a highly reflective mirror 12, which operates as one end of the laser oscillator 10. Continuing in the beam path from reflective mirror 12 in order are a Q-switch 14, a polarizer 16, an iris 18, a safety shutter 19, a first pump cavity 20, a 90 degree rotator 22, a second pump cavity 24, and then a partially reflecting mirror 26, which operates as the terminator or output coupler for defining the laser oscillator 10.

In the embodiment shown in FIG. 1, two pump cavities 20 and 24 are utilized with a 90 degree rotator 22 disposed there between. The 90 degree rotator 22 rotates the polarization direction of the oscillating laser beam by 90 degrees and therefore compensates for stress birefringence effects.

In some embodiments of the invention, an internal telescope 13 (FIG. 7) may be constructed within laser oscillator 10. As seen in FIG. 7, telescope 13 may also be disposed within an oscillator of the single cavity type. Telescope 13 focusing power is determined by the geometry of laser oscillator 10 for optimizing the diameter of the oscillator laser beam, and for controlling or reducing thermal lensing effects created by other elements of laser oscillator 10.

The present invention is formed by. selecting and forming iris 18 to select a particular mode to be created in laser oscillator 10.

Of particular importance is the optical diameter of iris 18. Compared to the beam developed in one form of the invention, the iris utilizes a size of 5 mm or less, but preferably 2 mm or less, to reduce the laser oscillator output beam 28 to a single-transverse-mode.

Oscillator 10 is specifically configured for laser shock peening. Oscillator 10 is effective for generating a series of laser pulses that can be sharpened by a pulse slicer. In accordance with the preferred embodiment, each laser pulse thereby created is substantially temporally shaped to optimally create the pressure pulse developed on the target (not shown) for the laser shock peening process.

The present invention, utilizing the correct and critical size of iris 18, has not been employed before in a laser oscillator for use with a laser peening system. Use of such iris 18 dramatically increases the lifetime of the optical components both within the laser oscillator 10 and along with optical elements downstream of output coupler 26. Multi-mode configuration beams typically deteriorate optics and optical coatings and generate hot spots therein. These hot spots create optical damage to such components. Typical data show that optical damage occurs within the first ten thousand laser pulses generated by the laser oscillator 10 when the appropriate sized iris is not used.

The data indicates that through the use of the iris 18 of particularly less than or equal to 5 mm in diameter, and more preferably at particular sizes of 2 or 3 mm, that up to one hundred thousand shots may be obtained without significant optical damage to associated optical elements. Such a small change surprisingly increases by at least a factor of 10, the lifetime of the optical components. Such an increase in the lifetime of optical components has a tremendous impact on the cost of laser processing.

In another embodiment of the invention, the required single transverse mode is produced by replacing the output coupler 26 with a gradient reflective mirror. The reflectivity of the mirror is configured such that it is high at its center but falls off radially over a distance comparable to the diameter of the laser rod. The reflectivity profile of the gradient mirror can be of the Gaussian or Super-Gaussian type. This configuration enables the center of the beam to be preferentially amplified relative to the outside part, producing a single transverse mode.

In one embodiment of the invention the temporal pulse emitted by oscillator 10 is shaped by using a pulse-slicer positioned after the output coupler 26 of the oscillator. A pulse-slicer is an optical switch that produces a laser pulse with a sharply rising leading edge that is limited to less than 5 nanoseconds. It typically consists of an electro-optical Q-switch and a polarizer. The Q-switch rotates the polarization 10 direction of the laser beam and the polarizer analyzes the beam. Initially the Q-switch is off (no voltage) and the laser beam is rejected from the system by the polarizer. After the slowly rising part of the pulse is rejected the Q-switch is activated (voltage on) and a beam with a fast rising edge is produced. The trailing edge of the pulse can be modified by turning the Q-switch off again.

In another embodiment the rising edge of the temporal pulse is limited to less than 5 nanoseconds by a phase conjugate cell (FIG. 2). A phase conjugation cell is a device that reverses the propagation direction of a laser beam and its spatial phase when the beam intensity is above a threshold value. Below the threshold, the slowly rising part of the laser pulse is not reflected and hence is removed from the beam.

In one embodiment the cell utilizes the nonlinear phenomena of stimulated Brillouin scattering (SBS). Brillouin scattering is the nonlinear optical phenomenon of the spontaneous scattering of light by it interaction with density variations within the medium through which it passes. The reflecting material within the cell typically consists of a gas or liquid. Standard reflecting materials consist of one or more of the following carbon tetrachloride, sulfur hexafluoride, freon, and carbon disulfide.

FIG. 2 illustrates one embodiment of the phase conjugate cell 40 as a pulse slicer. In this case, the linearly polarized beam emitted by oscillator 10 passes through a Faraday isolator 42, a polarizer 44, a quarter waveplate 46 and becomes circularly polarized. The beam is then reflected from the phase conjugate cell 40, passes again through the quarter waveplate and is rejected from the system by the polarizer 44.

The Faraday isolator 42 functions as an optical diode. Photons that are reflected from the phase conjugate cell and that leak through the polarizer are prevented from returning to the oscillator by the isolator 42. The isolator 42 consists of a Faraday rotator that has a polarizer located at its entrance and exit ports. The Faraday rotator utilizes a rod of terbium gallium garnet within a solenoid-generated axial magnetic field to rotate the polarization direction of a laser beam by 45 degrees. Such polarizers are configured to pass the oscillator laser beam and prevent passage of a reflected laser beam.

In another embodiment of the invention the coherent radiation emitted by the single mode oscillator 10 is amplified by multipass amplification. Multipass amplification is the rocess by which a laser beam is amplified by passing it more han once through the same amplifier medium. An embodiment of his technique is shown in FIG. 3. A polarized laser beam emitted by oscillator 10 passes through a Faraday isolator 42 and a polarizer 44. The beam then passes through a first amplifier 50, a 90 degree rotator 22, a second amplifier 52, a quarter waveplate 46, and then is reflected from mirror 54. Mirror 54 can be a dielectric reflective mirror or a phase conjugate mirror. Depolarization occurring in the first amplifier head is corrected by 90 degree rotator 22 and the second amplifier 52. After reflection from mirror 54, the beam passes again through the amplifiers 52, 50 and is rejected by polarizer 44 into another amplifier chain (not shown).

In another embodiment of the invention, the coherent radiation emitted by the single mode oscillator is amplified by one or more amplifiers. A 90 degree rotator and beam shaping optics, such as a telescope can be placed between amplifiers for birefringence correction.

In one form of the single-transverse-mode oscillator created with the particular iris 18 to be discussed herein, it is not necessary to utilize two pump cavities. Without utilizing two pump cavities 20, 24 no such 90 degree rotator 22 would be used.

Such a single cavity device utilizing a porro prism 38 is shown in FIG. 4. The porro prism 38 in combination with an optical rotator compensates for stress birefringence. The rotator can be a phase plate or a 45 degree rotator. The laser beam exits oscillator 10 off of the polarizer 16, after Q-switch 14 is triggered.

In one embodiment of the present invention, the oscillator is made to operate in a single-transverse-mode by utilizing an iris 18 sized to most preferably approximately 2 mm, or at least preferably equal to or less than 5 mm in diameter.

A particular difference between laser oscillator 10 shown in FIG. 1 and that shown in FIG. 4 is that the elimination of the second pump cavity 24 and 90 degree rotator 22. One advantage of this design is that the Q-switch is exposed to a lower energy density.

The invention further may include a means for generating a single-longitudinal-mode laser pulse. One such means is by utilizing a seed laser or alternatively using an etalon within the laser beam path.

FIG. 5 shows one means for generating a single-longitudinal-mode laser pulse by utilizing a seed laser 30 which creates a low energy, single frequency, laser beam 32 which first passes through a Faraday isolator 34 and then is reflected into the oscillator cavity off of a polarizer 16. Seed laser 30 may be a solid state laser known in the art such as a diode laser, or may be a flashlamp pumped laser containing a YLF crystal. Although FIG. 5 shows the seed laser 30 entering through polarizer 16, it may be possible to have the seed laser beam 32 enter through the back of reflective mirror 12. Inside the oscillator cavity, the number of photons at the seed laser wavelength is significantly greater than photons produced at other wavelengths by spontaneous emission. Therefore, the seed photons buildup faster resulting in a single-longitudinal-mode beam at the wavelength of seed laser 30.

FIG. 6 shows a laser oscillator utilizing an etalon 38 to generate a single-longitudinal-mode laser pulse. An etalon consists of two plane-parallel, highly reflective, optical surfaces that are separated by a fixed distance. As the optical beam passes through this component, it is reflected and transmitted by these surfaces. This leads to constructive and destructive interference effects that enable the component (etalon 38) to act as a wavelength filter, eliminating all longitudinal modes except the desired one. The wavelength selectivity of the etalon 38 can be adjusted by rotating the etalon about its vertical axis.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for laser peening a workpiece, the method comprising:
    generating a laser pulse from a substantially single-transverse-mode oscillator;
    modifying said laser pulse with a pulse sharpening device;
    means for amplifying said laser pulse; and
    directing said laser pulse to the workpiece.
2. The method of claim 1 wherein said oscillator provides means for compensating for stress birefringence.
3. The method of claim 2 wherein said oscillator comprises a dual-pump-cavity configuration with a 90 degree rotator between the pump cavities.
4. The method of claim 2 wherein said oscillator further comprises a porro prism.
5. The method of claim 1 wherein said oscillator also provides means for generating a single-longitudinal-mode laser pulse.
6. The method of claim 5 wherein said means for generating a single-longitudinal-mode is a seed laser.
7. The method of claim 5 wherein said means for generating said single-longitudinal-mode laser pulse is an etalon.
8. The method of claim 1 wherein said oscillator contains an aperture with an opening of less than 5 mm.
9. The method of claim 1 wherein said oscillator utilizes a gradient reflector.
10. The method of claim 1 wherein said pulse sharpening device is an electro-optical pulse slicer.
11. The method of claim 10 wherein said pulse sharpening device modifies both the leading edge and the trailing edge of said laser pulse.
12. The method of claim 1 wherein said pulse sharpening device is a phase conjugation cell.
13. The method of claim 1 wherein said amplifying means is a series of Nd:glass amplifiers.
14. The method of claim 13 wherein said amplifying means further comprises a means for birefringence compensation of the laser pulse as said laser pulse passes through said amplifying means.
15. The method of claim 14 wherein said means for birefringence compensation is a 90 degree rotator.
16. The method of claim 1 wherein said amplifying means is a multi-pass amplification.
17. The method of claim 16 wherein said multi-pass amplification comprises a phase conjugation device and a means for birefringence compensation.
18. The method of claim 17 wherein said means for birefringence compensation is a 90 degree rotator.
19. An apparatus for laser peening a workpiece, said apparatus comprising:
    a substantially single-transverse-mode laser oscillator to create a laser pulse;
    a laser pulse-sharpening device to sharpen said laser pulse;
    means for amplifying said laser pulse; and
    a laser peening cell into which said pulse is directed.
20. The apparatus of claim 19 wherein said oscillator also provides means for compensating for stress birefringence.
21. The apparatus of claim 20 wherein said oscillator comprises a dual-pump-cavity configuration with a 90 degree rotator between the pump cavities.
22. The apparatus of claim 20 wherein said oscillator further comprises a porro prism.
23. The apparatus of claim 19 wherein said oscillator also provides means for generating a single-longitudinal-mode laser pulse.
24. The apparatus of claim 23 wherein said means for generating a single-longitudinal-mode is a seed laser.
25. The apparatus of claim 23 wherein said means for generating said single-longitudinal-mode laser pulse is an etalon.
26. The apparatus of claim 19 wherein said oscillator contains an aperture with an opening of less than 5 mm.
27. The apparatus of claim 19 wherein said oscillator utilizes a gradient reflector.
28. The apparatus of claim 19 wherein said pulse sharpening device is an electro-optical pulse slicer.

29. The apparatus of claim 28 wherein said pulse sharpening device modifies both the leading edge and the trailing edge of said laser pulse.

30. The apparatus of claim 28 wherein said pulse sharpening device is a phase conjugation device.

31. The apparatus of claim 19 wherein said amplifying means is a series of Nd:glass amplifiers.

32. The apparatus of claim 31 wherein said amplifying means further comprises a means for birefringence compensation of the laser pulse as said laser pulse passes through said amplifying means.

33. The apparatus of claim 32 wherein said means for birefringence compensation is a 90 degree rotator.

34. The apparatus of claim 19 wherein said amplifying means is by multi-pass amplification.

35. The apparatus of claim 34 wherein said multi-pass amplification comprises a phase conjugation device and a means for birefringence compensation.

36. The apparatus of claim 35 wherein said means for birefringence compensation is a 90 degree rotator.

37. The apparatus of claim 19 further including a telescope.

38. The method of claim 1 in which said generating step includes utilization of a telescope within the oscillator.

* * * * *

(12) EX PARTE REEXAMINATION CERTIFICATE (8336th)
United States Patent
Dulaney et al.

(10) Number: US 6,373,876 C1
(45) Certificate Issued: Jun. 21, 2011

(54) SINGLE MODE OSCILLATOR FOR A LASER PEENING LASER

(75) Inventors: Jeff Dulaney, Dublin, OH (US); David Sokol, Dublin, OH (US)

(73) Assignee: LSP Technologies, Inc., Dublin, OH (US)

Reexamination Request:
No. 90/011,207, Sep. 24, 2010

Reexamination Certificate for:
Patent No.: 6,373,876
Issued: Apr. 16, 2002
Appl. No.: 09/178,968
Filed: Oct. 26, 1998

(51) Int. Cl.
*B23K 26/06* (2006.01)
*C21D 10/00* (2006.01)
*G02B 5/08* (2006.01)
*H01S 3/08* (2006.01)

(52) U.S. Cl. .......................... 372/98; 372/103; 372/18; 372/19; 372/99; 219/121.68; 359/739

(58) Field of Classification Search .................. None
See application file for complete search history.

(56) References Cited

U.S. PATENT DOCUMENTS

| | | | |
|---|---|---|---|
| 5,127,019 | A | 6/1992 | Epstein et al. |
| 5,640,406 | A | 6/1997 | Injeyan et al. |
| 5,730,811 | A | 3/1998 | Azad et al. |

OTHER PUBLICATIONS

Saleh et al. Fundamentals of Photonics. John Wiley and Sons. 1991. pp. 310–341, 513–518.*

Dane, et al., "Design and Operation of a 150 W Near Diffraction–Limited Laser Amplifier with SBS Wavefront Correction," IEEE Journal of Quantum Electronics, vol. 31, Jan. 1995, pp. 148–163.

Dane, et al., "Diffraction–limited, high average power phase–locking of four 30J beams from discrete Nd:glass zig–zag amplifiers," Apr. 24, 1997 (UCRL–JC–127264) Release Date Apr. 25, 1997, 7 pages.

Hackel, et al., "Laser Shot Peening of Metals: Techniques and Laser Technology," (UCRL–JC–128351 ABS), Release Date: Jul. 30, 1997, 2 pages.

Dane, et al., "Laser Peening of Metals—Enabling Laser Technology," Nov. 13, 1997, (UCRL–JC–129029), Release Date Nov. 19, 1997, pp. 1–14.

Richards, J "Birefringence compensation in polarization coupled lasers," Applied Optics, vol. 26, No. 13, Jul. 1987, pp. 2514–2517.

Koechner, Walter, Solid–State Laser Engineering, second edition, Springer–Verlag, Jan. 1988, pp. 171, 189–203, 219, 223, 240, 241, 414, 415.

Berry, A.J., et al., "High Power, Single Frequency Operation of a Q–Switched TEM00 Mode Nd:YAG Laser," Quantum Electronics and Electro–Optics, John Wiley & Sons, Mar. 1983, pp. 37–40.

Hodgson, Norman, et al., Laser Resonators and Beam Propagation Fundamentals, Advanced Concepts and Applications, Second Edition, Springer Science and Business Media, Jun. 16, 2005, pp. 245–247.

* cited by examiner

*Primary Examiner* — Deandra M Hughes

(57) ABSTRACT

A technique for increasing the lifetime of optical components that are used in a laser for laser shock peening. The technique employs a properly sized iris or a gradient reflector within a laser oscillator to produce a single-transverse-mode laser beam. This technique eliminates hot spots that significantly reduce the lifetime of optical components. Utilization of the present invention can increase the lifetime of components by a factor of ten of their conventional lifetime.

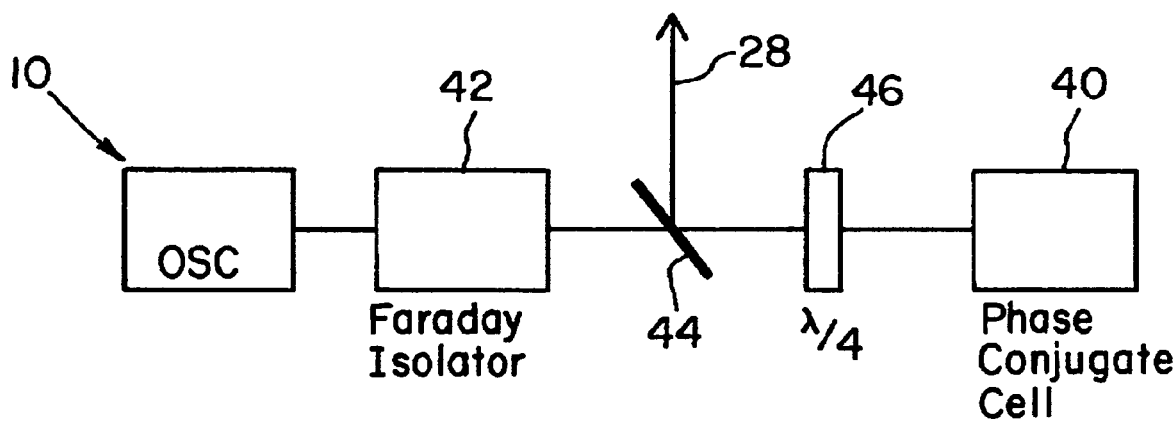

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-38 is confirmed.

* * * * *

(12) EX PARTE REEXAMINATION CERTIFICATE (8876th)
United States Patent
Dulaney et al.

(10) Number: US 6,373,876 C2
(45) Certificate Issued: Feb. 28, 2012

(54) SINGLE MODE OSCILLATOR FOR A LASER PEENING LASER

(75) Inventors: Jeff Dulaney, Dublin, OH (US); David Sokol, Dublin, OH (US)

(73) Assignee: LSP Technologies, Inc., Dublin, OH (US)

Reexamination Request:
No. 90/011,687, May 11, 2011

Reexamination Certificate for:
Patent No.: 6,373,876
Issued: Apr. 16, 2002
Appl. No.: 09/178,968
Filed: Oct. 26, 1998

Reexamination Certificate C1 6,373,876 issued Jun. 21, 2011

(51) Int. Cl.
B23K 26/06 (2006.01)
C21D 10/00 (2006.01)
G02B 5/08 (2006.01)
H01S 3/08 (2006.01)

(52) U.S. Cl. ............ 372/98; 219/121.68; 359/739; 372/103; 372/18; 372/19; 372/99

(58) Field of Classification Search .............. None
See application file for complete search history.

(56) References Cited

To view the complete listing of prior art documents cited during the proceeding for Reexamination Control Number 90/011,687, please refer to the USPTO's public Patent Application Information Retrieval (PAIR) system under the Display References tab.

*Primary Examiner* — Christina Y Leung

(57) ABSTRACT

A technique for increasing the lifetime of optical components that are used in a laser for laser shock peening. The technique employs a properly sized iris or a gradient reflector within a laser oscillator to produce a single-transverse-mode laser beam. This technique eliminates hot spots that significantly reduce the lifetime of optical components. Utilization of the present invention can increase the lifetime of components by a factor of ten of their conventional lifetime.

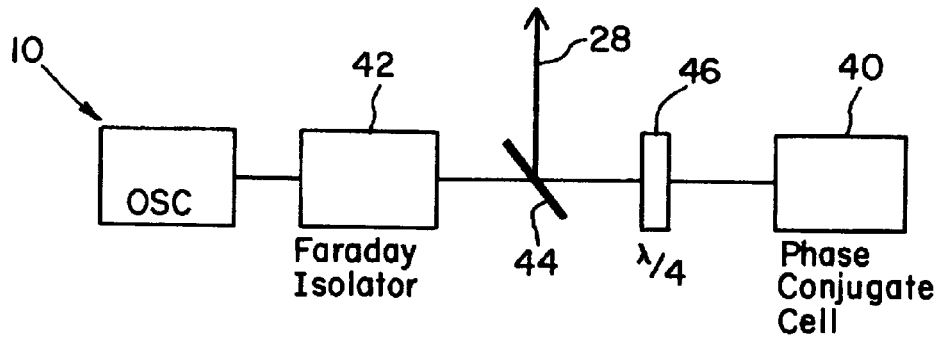

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-38 is confirmed.

* * * * *

(12) EX PARTE REEXAMINATION CERTIFICATE (9480th)
United States Patent
Dulaney et al.

(10) Number: US 6,373,876 C3
(45) Certificate Issued: Jan. 14, 2013

(54) SINGLE MODE OSCILLATOR FOR A LASER PEENING LASER

(75) Inventors: Jeff Dulaney, Dublin, OH (US); David Sokol, Dublin, OH (US)

(73) Assignee: LSP Technologies, Inc., Dublin, OH (US)

Reexamination Request:
No. 90/012,148, Feb. 16, 2012

Reexamination Certificate for:
Patent No.: 6,373,876
Issued: Apr. 16, 2002
Appl. No.: 09/178,968
Filed: Oct. 26, 1998

Reexamination Certificate C1 6,373,876 issued Jun. 21, 2011

Reexamination Certificate C2 6,373,876 issued Feb. 28, 2012

(51) Int. Cl.
*B23K 26/06* (2006.01)
*C21D 10/00* (2006.01)
*G02B 5/08* (2006.01)
*H01S 3/08* (2006.01)

(52) U.S. Cl. ............. 372/98; 219/121.68; 359/739; 372/103; 372/18; 372/19; 372/99

(58) Field of Classification Search .............. None
See application file for complete search history.

(56) References Cited

To view the complete listing of prior art documents cited during the proceeding for Reexamination Control Number 90/012,148, please refer to the USPTO's public Patent Application Information Retrieval (PAIR) system under the Display References tab.

*Primary Examiner* — James Menefee

(57) ABSTRACT

A technique for increasing the lifetime of optical components that are used in a laser for laser shock peening. The technique employs a properly sized iris or a gradient reflector within a laser oscillator to produce a single-transverse-mode laser beam. This technique eliminates hot spots that significantly reduce the lifetime of optical components. Utilization of the present invention can increase the lifetime of components by a factor of ten of their conventional lifetime.

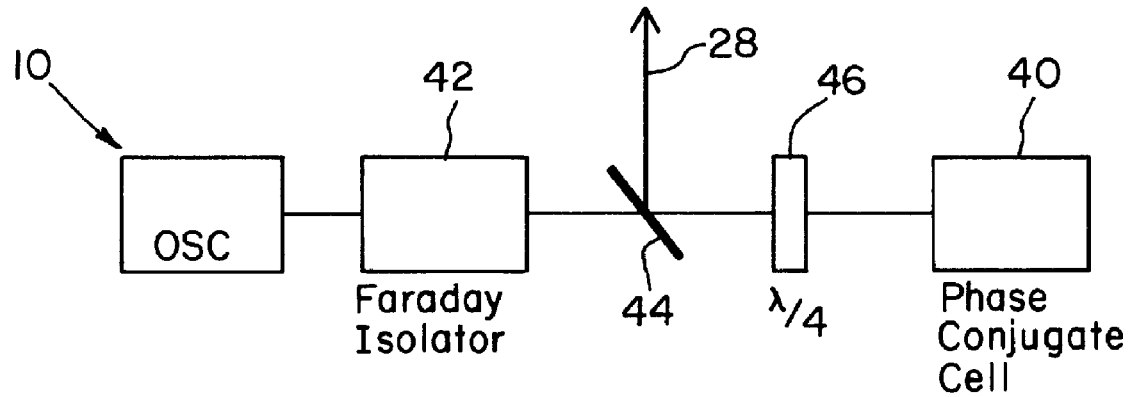

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-38 is confirmed.

\* \* \* \* \*